Aug. 12, 1930.  P. M. ARTIGUE  1,772,622
MOTION PICTURE COLOR PHOTOGRAPHY
Filed May 11, 1927
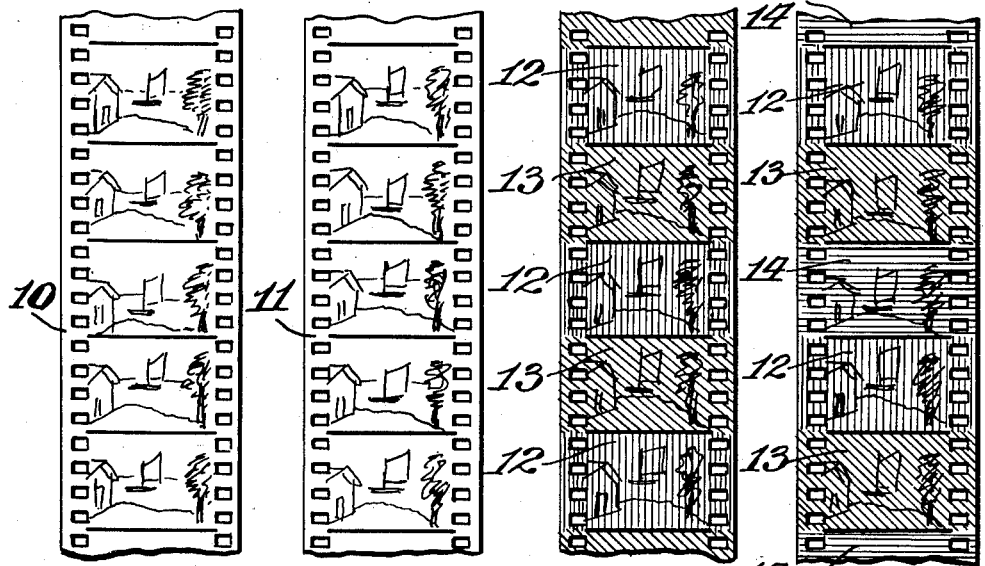
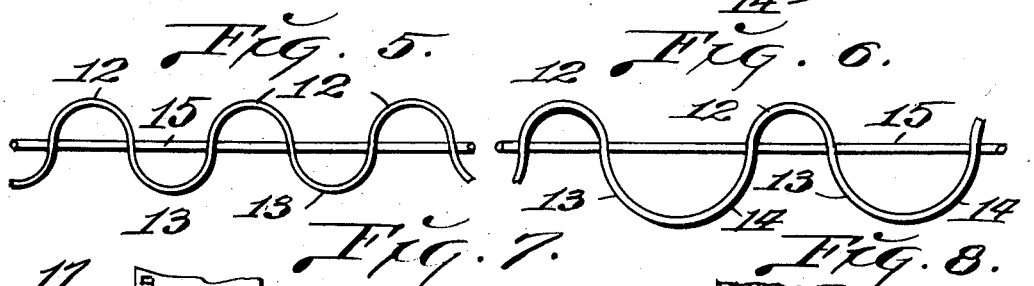
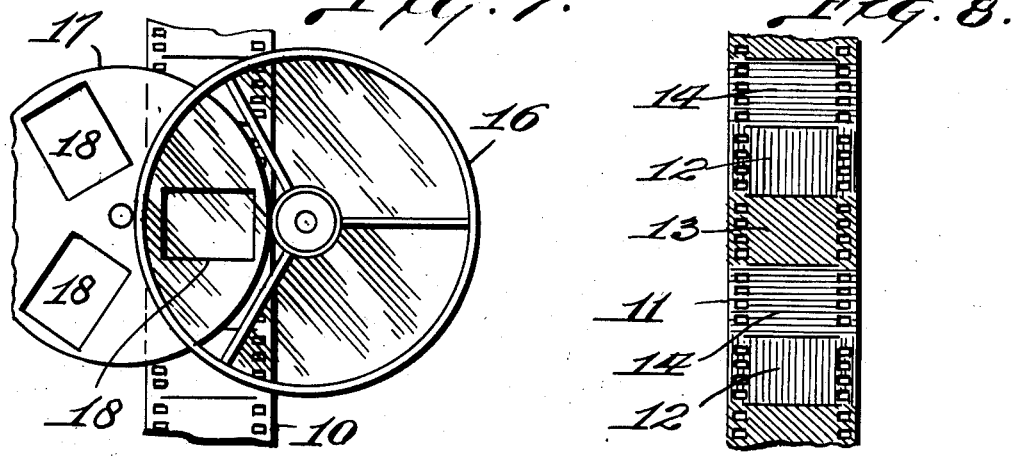
INVENTOR,
Pierre M. Artigue.
By Martin & Smith atty.

Patented Aug. 12, 1930

1,772,622

UNITED STATES PATENT OFFICE

PIERRE M. ARTIGUE, OF LOS ANGELES, CALIFORNIA

MOTION-PICTURE COLOR PHOTOGRAPHY

Application filed May 11, 1927. Serial No. 190,595.

My invention relates generally to the art of photography and more particularly to a method of producing colored motion pictures, the object of my invention being to provide a relatively simple and easily practiced method whereby motion pictures in color may be taken and produced upon a screen and which method involves only the use of standard films, both positive and negative, as well as standard forms of motion picture cameras, projecting machines and color filters or screens.

Obviously the production of colored motion pictures with standard equipment and apparatus will greatly simplify and lessen production costs as compared to colored motion pictures that require in their making, special films, as well as special cameras, lenses, projecting machines, color screens, and the like.

With the foregoing and other objects in view, my invention consists in certain novel steps and procedures in the taking, coloring and projection of motion pictures and in order that my improved method may be more readily understood, reference may be had to the accompanying drawings, in which—

Fig. 1 is an elevational view of a short section of motion picture film having the standard frames and which has been run through a standard form of camera to produce a negative.

Fig. 2 is an elevational view of a short section of film that has been printed from the negative to provide a standard form of positive film.

Fig. 3 is an elevational view of a short section of the positive film after the frames thereof have been alternately colored red and green.

Fig. 4 is an elevational view of a section of the positive film after the frames thereof have been colored in sequence red, green and blue or blue-violet.

Fig. 5 is an elevational view of a section of the positive film threaded onto a suitable support in order to facilitate the dyeing or coloring of the frames to provide a two-color positive film.

Fig. 6 is an elevational view of a section of the film threaded upon suitable supports so that the frames of said film may be dyed or colored to produce a three-color positive film.

Fig. 7 is an elevational view of a short section of film with a color filter or screen and a shutter associated therewith to provide a three-color negative film.

Fig. 8 is an elevational view of a short section of positive film that has been printed from the negative produced with a color filter or screen and the frames of which positive filter are successively colored red, green and blue or blue-violet.

The first step in the production of colored motion pictures by my improved method involves the making of an ordinary standard negative film 10 by passing said film through a standard form of motion picture camera, thereby producing the usual series of frames, each bearing a picture and which average about sixteen frames to each foot of film. From this standard negative, a standard positive film 11 is printed and where a two-color picture is desired, frames of the positive film are alternately colored, either by printing or dyeing, red and green, thereby producing a film of the type illustrated in Fig. 3, which is made up of a series of red frames 12 which alternate with green frames 13.

In the event that a three-color positive film is desired, the frames of the film are colored by printing or dyeing in proper sequence, red, green and blue or blue-violet, as illustrated in Fig. 4. The blue or blue-violet frames are designated by the numeral 14. The frames of the positive may be dyed or colored in any manner desired, either by hand, by mechanical printing, or by dyeing and, in the event that the frames are dyed, I prefer to mount the same upon rods such as 15, which latter pass through the apertures that are formed near the sides of all standard film and the arrangement being such that the alternate frames are disposed on opposite sides of the supports 15, as illustrated in Fig. 5, thus enabling a relatively large number of the frames on one side of the supports to be simultaneously dyed or colored red and by reversing the supporting means, the frames on the opposite sides thereof may be dyed or colored green.

Where a three-color positive film is to be produced, the film is threaded on the supports 15, as illustrated in Fig. 6, each third frame of said film being arranged on one side of said supports and the intermediate two frames being disposed on the other side of said supports. Such arrangement enables every third frame to be dyed or colored one of the three colors and then by changing the film on its supports, the other two frames may be brought into position where they may be conveniently dyed or colored.

I have demonstrated in tests and experiments that my improved method may be very advantageously employed in connection with the production of stereoptic motion pictures for the alternate or sequential coloring of the frames of the film coact with the results produced by the stereoptic cameras and projecting machines in producing highly effective stereoptic motion pictures.

Thus by my improved method, standard two or three color positive films are produced and when such films are run through a projecting machine at the standard speed, namely approximately sixteen frames per second, the pictures on the differently colored frames are thrown onto the screen at such speed that the human eye cannot differentiate between the two or three colors and consequently the colors are blended so as to produce pleasing pictures having red and green colors and the combination or the tones or shades produced by the combination of these two primary colors.

In other words, where a two-color positive is being projected, one picture thrown onto the screen will be entirely red, the picture from the next frame will be entirely green, the next red and the next green, but owing to the speed at which the pictures are produced, it is impossible to distinguish the individual frames or pictures and consequently a blending of the two colors is produced to give the desired effect of colored motion pictures.

Identically the same methods as just described are employed in the projection of a three-color film of the type illustrated in Fig. 4 and where such film is run through the projecting machine, the successive pictures thrown onto the screen are colored in proper sequence, red, green and blue or blue-violet, thereby producing pictures having these three colors and the shades, tones and combinations thereof.

To enhance or strengthen the colors on the colored positive films that are run through the projecting machine, the standard negative, when made, may be taken through a filter or screen capable of cutting out or filtering two or three colors.

In Fig. 7, I have illustrated a standard form of rotary filter 16 having three sections, one of which filters out the green and blue or blue-violet rays, another section adapted to filter the blue or blue-violet and red rays, and the third section adapted to filter the red and green rays. Associated with this apparatus, is a standard form of shutter 17 having an opening 18, that is adapted to register with the successive frames as they pass the lens opening of the camera and at such time one of the filter sections of the filtering disk 16 registers with the opening 18.

Thus the negative film, after passing through the machine equipped with a three collar filter or screen, has one frame from which the green and blue or blue-violet rays have been removed, the next frame is devoid of red and blue or blue-violet rays and the next adjacent frame is devoid of the red and green rays and which three frames are known as the red, green and blue or blue-violet negative frames.

From this three-color negative, a positive print is made upon standard film stock and, in order to enhance or intensify the colors when the finished positive is passed through the projecting machine, each red frame on the positive or the frame from which the green and blue or blue-violet colors have been eliminated is colored red, each green frame is dyed or colored green and each blue or blue-violet frame is dyed or colored blue-violet. When this colored positive is passed through a standard projecting machine, the motion picture produced upon the screen will appear in colors and, due to the fact that the contrasting color rays have been filtered out of the frames and said frames strengthened in color by the addition of proper dyes or colors, the produced picture will be greatly increased in color tones and values.

While I have shown and described the production of a three-color positive filter, it will be understood that practically the same methods may be employed in the production of a two-color positive film.

I have herein described and referred to the use of standard films in the production of colored motion pictures by my improved method, but it will be understood that the same methods may be employed in the production of "off-standard" films or films that have greater or less width than the standard motion picture film.

In some instances it may be found desirable and advantageous to run a two or three color positive film through a projecting machine that is equipped with a two or three color screen substantially of the type illustrated in Fig. 7, with said screen operating so as to bring its differently colored sections into registration with the correspondingly colored frames of the film and thus the colors of said frames will be materially strengthened or increased when thrown onto the screen.

Thus it will be seen that I have provided a relatively simple and easily practiced method of producing colored motion pictures and which method involves only one negative film, one positive film, the frames of the latter being properly colored and said positive film being run through a standard form of motion picture projecting machine.

I claim as my invention:

1. The herein described method of coloring motion picture films which consists in mounting a positive film upon supports that are threaded through the apertures at the sides of the film so that certain of the frames of the film are disposed on one side of the supports and the other frames on the other side of said supports, then coloring the frames of said film on one side of said supports and then distinctively coloring the frames of the film on the other side of said supports.

2. The herein described method of coloring motion picture films which consists in mounting a positive film upon supports that are threaded through the apertures at the sides of the film so that certain of the frames of the film are disposed on one side of the supports and the other frames on the other side of said supports and then distinctively coloring in proper sequence the frames of the film that are on opposite sides of said supports.

3. The herein described method of coloring motion picture films which consists in mounting a positive film upon supports that are threaded through the apertures at the sides of the film so that certain of the frames of the film are disposed on one side of the supports and the other frames on the other side of said supports, then simultaneously coloring all of the frames of the film on one side of said supports and then simultaneously distinctively coloring the frames of the film on the other side of said supports.

4. The herein described method of coloring the frames of motion picture film, which consists in arranging the film in the form of a sinusoid, then coloring the frames of the film on one side of the axis of the sinusoid and then distinctively coloring the frames on the other side of said axis.

5. The herein described method of coloring motion picture film which consists in arranging the film in the form of a sinusoid, then simultaneously and correspondingly coloring the frames of the film on one side of the axis of the sinusoid and then simultaneous and distinctively coloring the frames of the film on the other side of said axis.

In testimony whereof I affix my signature.

PIERRE M. ARTIGUE.